United States Patent Office 3,551,552
Patented Dec. 29, 1970

3,551,552
METHOD EMPLOYING GASKETS FOR
CASTING PLASTIC ARTICLES
Vincent J. Opalewski, Rockaway, N.J., assignor to
Allied Chemical Corporation, New York, N.Y., a corporation of New York
No Drawing. Filed Feb. 24, 1969, Ser. No. 801,831
Int. Cl. B29c 1/02, 5/00
U.S. Cl. 264—331    11 Claims

ABSTRACT OF THE DISCLOSURE

A compressible and wettable paper gasket is provided in a mold for casting articles from a non-viscous charge of casting composition. The paper is compressed between the mold parts to fill gross variations between the mating surfaces thereof, and it swells upon bieng wetted with the non-viscous charge to fill fine variations between the mating surfaces.

BACKGROUND OF THE INVENTION

This invention relates to a method for casting plastic articles in a mold, and in particular, it relates to the use of an improved gasket for sealing the mold.

In casting plastic articles, a charge of the plastic material is introduced into a mold and is cured to provide the hard cast article. The mold, which consists of at least two separable parts to facilitate removal of the finished article, must be sealed to prevent leakage of the charged material during the casting operation. This sealing requirement does not present a problem when the charged material is viscous, but when it is a non-viscous material certain precautions must be taken to prevent loss of material between the mating surfaces of the separable mold parts. It is often possible to provide an adequate seal by machining the mating surfaces very accurately to provide a perfect match, but this technique is very costly and also requires a very uniform distribution of sealing pressure around the mold for holding the separable parts together; with uneven distribution of sealing pressure, even highly accurate surfaces will not provide an adequate seal.

For this reason, gaskets are usually provided between the mating surfaces to provide a more convenient and dependable seal. Materials which have been commonly utilized in these gaskets include polytetrafluoroethylene and other inert plastics, silicone rubber, sheet metal, etc. These gaskets are compressible to varying degrees and provide a seal between the mating surfaces in spite of variations in the surfaces (i.e., poorly matched mating surfaces). However, relatively high sealing pressures are required for these gaskets and a poor distribution of pressure will often still result in inadequate seals. Cellulosic fiber has often been incorporated in the gasket material, and, in fact, is often the major component thereof. However, in all situations where the gasket was intended for sealing purposes with a liquid casting system, the cellulosic fiber was rendered unwettable with sizing so that it would not absorb the liquid and would provide a proper seal. Sizing materials employed for coating the cellulosic fiber for this purpose include starch, sugar, waxes, various polymeric coatings, etc. Unfortunately, the sizing additives utilized to render cellulosic fiber-containing gaskets unwettable usually had the effect of limiting the temperatures to which they could be subjected. Often, the sized cellulosic fibers could not withstand temperatures greater than about 250° F., but special additives have become available which permit temperatures approaching 300° F. The usefulness of these improved cellulosic fiber-containing gaskets has been limited, nevertheless, since many plastics require casting at temperatures in excess of 300° F. For example, casting polymers from higher monomer lactams, such as ε-caprolactam, by means of the low temperature anionic polymerization technique requires temperatures in excess of about 300° F.

Various attempts have been made to utilize more compressible gaskets than those made of aforementioned materials in order to permit lower sealing pressures for the mold parts and less stringent pressure distribution requirements. However, these attempts have typically been unsuccessful, if for no other reason than that the gaskets have not been rigid enough to permit easy preparation and handling. For example, various felt gaskets have been too limp to prepare by die cutting and could not be easily stored or handled.

SUMMARY OF THE INVENTION

It has now been found that in the method of casting plastic articles by introducing a non-viscous charge into a mold which has at least two separable parts, curing the charge to a hard cast article within the mold which article is then removed therefrom, the heretofore mentioned difficulties are overcome by providing a gasket between the mating surfaces of the separable parts of the mold, said gasket consisting essentially of a compressible and wettable cellulosic fiber paper which swells upon being wetted by said non-viscous charge. The use of this paper gasket effectively seals the mold parts in spite of gross and fine variations in the mating surfaces.

DETAILED DESCRIPTION OF THE INVENTION

In practicing the instant invention, a cellulosic fiber paper gasket, hereinafter referred to simply as a paper gasket, is provided between the mating surfaces of mold parts when a non-viscous liquid charge is to be cast into a plastic article. The paper gasket is compressed to a certain extent when the mold is sealed, thereby compensating for gross variations in the mating surfaces of the mold parts, i.e., gross deviations from co-planarity between the mating surfaces, and upon being wetted by the liquid charge it swells to compensate for fine variations. Polytetrafluoroethylene gaskets and others used heretofore do not adequately compensate for these fine variations, since compression of the gasket will not cause it to fill scratches and other fine imperfections in the surfaces. The cellulosic fiber-containing gaskets of the prior art do not have the same sealing capacity as the instant paper gaskets since they were purposely rendered non-wettable and non-swellable, i.e., the prior art objective was to render the gasket impervious to the liquid casting composition while it is a feature of the instant invention that the gasket not be impervious.

Since the instant paper gaskets must be compressible as well as wettable, it is preferable that the paper have a relatively low bulk density, for example less than about 40 pounds per cubic foot. More preferably, the bulk density of the paper will be between about 15 and 25 pounds per cubic foot. Distinction is drawn here between specific gravity and bulk density, which is "apparent specific gravity" and takes acount of air space within the paper structure. By utilizing papers with these low bulk densities, the gasket is easily compressed when the mold is sealed, although the degree of compression is not critical to obtaining an adequate seal. Heretofore, substantial compression with relatively high sealing pressure was required to provide a good seal but this is no longer necessary. In fact, with the instant paper gaskets, a good seal will be obtained when the gasket is compressed only to the extent necessary to retain it in place. For example, depending upon the total compressibility of the specific gasket, a seal is obtained by taking up as little as about 5%, but preferably at least about 15%, of its compressibility. For best results, the gasket should be compressed to the extent of at least about 2% of its original thickness, preferably at least about 10% of its original thickness.

It is necessary that the instant gaskets be wettable by the non-viscous liquid charge, since it is by this feature that the seal is perfected. For purposes of this invention, a paper is considered wettable if it is capable of absorbing the non-viscous liquid charge. The preference for low bulk density papers for easier compression is also relevant with respect to the need for a wettable gasket, since the relatively open structure of this paper facilitates wetting. Upon being wetted by the liquid charge the paper will swell and perfect the seal. The minimum swelling required in the instant paper gaskets upon being wetted, is, of course, dependent upon the compressibility of the paper, but it has been found that paper which will swell to at least about 110% of its initial thickness is usually adequate. Preferably, the wetted paper will swell to at least 175% of its initial thickness.

Because of the requirement that the instant paper gasket be wettable and swellable, it is preferable to avoid incorporating therein sizing and other additives commonly used in the prior art which might render the paper and the individual fibers thereof resistant to the liquid charge. Any additives which do not render the paper or fibers resistant to the liquid charge might be present if desirable for other purposes, including sizing which is soluble in the charge, but it is preferred that the paper be unsized. In this regard, it should be noted that all papers which are wettable will not necessarily swell. For example, a very low bulk density paper may absorb the liquid charge and therefore be considered wettable according to the instant invention, but if the fibers thereof are not also wettable the paper will not swell. Conversely, a moderately low bulk density paper may swell upon being wetted, even when the fibers thereof are not wettable.

By means of simple experimentation, one may readily determine whether a specific cellulosic fiber paper gasket is operative in the instant invention. Any cellulosic fiber paper gasket which can be compressed to the extent of at least about 2% of its original thickness by pressures typically used to seal molds in casting operations, which is wettable by the non-viscous liquid charge and which will swell to at least 110% of its original thickness upon being so wetted is operative.

In using these gaskets in the casting operation, one is able to take advantage of a unique cooperation between the compression and swelling capabilities of the material. When considerable sealing pressure is exerted on the mold parts, the paper gasket will fill the fine variations as well as the gross variations in the mating surfaces and will be highly compressed, thereby rendering it inpenetrable to the non-viscous liquid charge. The gasket will not become wet and swell, therefore, but the mold will still not leak by virtue of the high level of compression. In the event that the liquid charge should start to leak between the mold parts, it will wet the paper and cause swelling, thereby increasing the sealing capacity of the gasket at the very position where it is required. Thus, when compression is adequate to provide an inpenetrable seal, no additional sealing is needed and no swelling occurs; where compression is inadequate, swelling will automatically compensate to prevent leakage.

Normally, the instant gaskets will have an initial thickness between about 0.03 and 0.20 inch, more preferably between about 0.06 and 0.15 inch. The actual thickness selected will be influenced by the complexity of gasket's configuration and its size, as well as by compressibility, pressure, distribution of pressure, etc.; the bigger and more complex the gasket, the thicker it should be in order to increase its rigidity for easier handling. Furthermore, gross variations from co-planarity in the mating surfaces become a greater problem with large molds, so a relatively thick gasket is beneficial. Typically, when the inner perimeter of the gasket is less than about 40 inches, an initial thickness of about 0.06 inch is used, and with inner perimeters greater than about 50 inches, an initial thickness of about 0.09 might be used.

An additional advantage of the instant gaskets is that they are rigid enough to be prepared by die cutting, although any available means might be used for cutting them to the proper shape. In accordance with common practice, the instant gaskets may be cut to a slightly larger size than the mold with which it is to be used, providing a slight recess from the mold cavity. Since it is imperative that the gasket not protrude into the cavity, this recess will facilitate positioning the gasket between the separable mold parts by providing a little leeway.

The cellulosic fiber paper gaskets of the instant invention may be effectively used to seal molds in any casting operation, but their unique properties are most advantageous when a non-viscous liquid composition is being cast, for example compositions having a viscosity less than about 1500 centipoise at operating temperatures. Among the low viscosity casting materials with which the instant invention might be advantageously used are vinyl plastisol, polyurethanes, polymers of higher monomeric lactams, and the like. Because of the stability of the gaskets at high temperatures, they are especially useful in casting operations conducted at temperatures of about 300° F. or higher, for example, when casting anionic polymerized nylon such as poly($\epsilon$-caprolactam) in the manner of U.S. Patents 3,015,652; 3,017,391; 3,018,273; 3,275,733; and 3,417,097. Unlike the cellulosic fiber-containing gaskets available heretofore, the instant gaskets are not affected by these elevated temperatures.

The following examples are provided to more fully illustrate the instant invention. They are provided for illustrative purposes only and are not to be constructed as limiting the claims, which are defined by the appended claims. Accordingly, variations and modifications from the examples may be made without departing from the spirit of the invention.

Example I

A 4" x 8" x 12" mold, divided along the long dimensions thereof into separable halves, was sealed with a cellulosic fiber paper gasket provided between the mating surfaces of the separable halves. The gasket consisted of a low bulk density, unsized paper having an initial thickness of 0.06 inch, and a thickness after being wetted by molten $\epsilon$-caprolactam of about 0.15 inch. The gasket was compressed to about 0.04 inch between the mold parts. A liquid preparation of 1.68 mol percent lithium caproylimide in dry $\epsilon$-caprolactam at 212° F. was mixed with a liquid preparation of 0.16 mol percent 2,4,6-triphenoxy-s-triazine in dry $\epsilon$-caprolactam at 212° F. This mixture was charged into the mold, which was preheated to about 300° F., and the temperature was then raised to 325° F. to produce the cast article. No leakage between the separable mold parts occurred.

Example II

The casting procedures of Example I of U.S. Patent 3,417,097 were conducted using a cellulosic paper gasket between the mold parts to produce a fourteen gallon tank with an overall profile of 23" x 17½" x 10½". The gasket consisted of a low bulk density, unsized paper. It had an initial thickness of 0.09 inch, and after being wetted by molten $\epsilon$-caprolactam it would swell to about 0.15 inch. The gasket was compressed to about 0.06 inch between the mold parts and no leakage occurred during the casting procedure.

I claim:

1. In the method of casting a plastic article from a non-viscous liquid charge in a mold which has at least two separable parts, the improvement which comprises providing a gasket between the mating surfaces of the separable mold parts, said gasket consisting essentially of a compressible and wettable cellulosic fiber paper which swells upon being wetted by said non-viscous charge.

2. The improved method of claim 1 wherein said cellulosic fiber paper is unsized.

3. The improved method of claim 1 wherein the bulk density of said cellulosic fiber paper is less than about 40 pounds per cubic foot.

4. The improved method of claim 1 wherein the initial thickness of said gasket is between about 0.03 and 0.20 inch.

5. The improved method of claim 1 wherein said cellulosic fiber paper will swell upon being wetted by the non-viscous charge to at least about 110% of its initial thickness.

6. In the method of casting a nylon article by introducing a charge of polymerizable lactam monomer, anionic polymerization catalyst and promoter therefor into a mold having at least two separable parts, heating the charged mold to at least about 300° F. to form a hard cast article, and removing the cast article from the mold, the improvement which comprises providing a gasket between the mating surfaces of said separable mold parts, said gasket consisting essentially of compressible and wettable cellulosic fiber paper which swells upon being wetted by said lactam monomer charge.

7. The improved method of claim 6 wherein said lactam monomer is ε-caprolactam.

8. The improved method of claim 6 wherein said cellulosic fiber paper is unsized.

9. The improved method of claim 6 wherein the bulk density of said cellulosic fiber paper is less than about 40 pounds per cubic foot.

10. The improved method of claim 6 wherein the initial thickness of said gasket is between about 0.03 and 0.20 inch.

11. The improved method of claim 6 wherein said cellulosic fiber paper will swell upon being wetted by the non-viscous charge to at least about 110% of its initial thickness.

References Cited

UNITED STATES PATENTS

| 2,542,386 | 2/1951 | Beattie | 264—328 |
|---|---|---|---|
| 3,273,205 | 9/1966 | Hanley | 264—313 |

ROBERT F. WHITE, Primary Examiner

G. AUVILLE, Assistant Examiner

U.S. Cl. X.R.

249—134; 264—337